(12) United States Patent
Sakai et al.

(10) Patent No.: US 12,535,185 B2
(45) Date of Patent: Jan. 27, 2026

(54) CORROSIVE-GAS-MIXTURE-FILLED CONTAINER AND CORROSIVE GAS COMPOSITION

(71) Applicant: SUMITOMO SEIKA CHEMICALS CO., LTD., Hyogo (JP)

(72) Inventors: Ryoichiro Sakai, Hyogo (JP); Hiroki Yamauchi, Hyogo (JP)

(73) Assignee: SUMITOMO SEIKA CHEMICALS CO., LTD., Hyogo (JP)

( * ) Notice: Subject to any disclaimer, the term of this patent is extended or adjusted under 35 U.S.C. 154(b) by 0 days.

(21) Appl. No.: 18/839,633

(22) PCT Filed: Mar. 15, 2023

(86) PCT No.: PCT/JP2023/010153
§ 371 (c)(1),
(2) Date: Aug. 19, 2024

(87) PCT Pub. No.: WO2023/189616
PCT Pub. Date: Oct. 5, 2023

(65) Prior Publication Data
US 2025/0155080 A1 May 15, 2025

(30) Foreign Application Priority Data
Mar. 31, 2022 (JP) .................. 2022-058734

(51) Int. Cl.
*F17C 1/14* (2006.01)

(52) U.S. Cl.
CPC ........ *F17C 1/14* (2013.01); *F17C 2201/0104* (2013.01); *F17C 2203/0639* (2013.01); *F17C 2203/0648* (2013.01); *F17C 2221/037* (2013.01)

(58) Field of Classification Search
CPC ...... F17C 2203/0648; F17C 2203/0639; F17C 2203/064; F17C 2203/063; F17C 1/00; F17C 1/005; F17C 1/14; F17C 1/10
See application file for complete search history.

(56) References Cited

U.S. PATENT DOCUMENTS

2022/0250908 A1* 8/2022 Tanimoto ............... B65D 85/84

FOREIGN PATENT DOCUMENTS

| JP | H9-279388 | 10/1997 |
| JP | 2000-097398 | 4/2000 |
| JP | 2000097398 A * | 4/2000 |

(Continued)

OTHER PUBLICATIONS

International Search Report issued in PCT/JP2023/010153, date of mailing May 16, 2023, translation, 3 pages.

(Continued)

*Primary Examiner* — Javier A Pagan
(74) *Attorney, Agent, or Firm* — HSML P.C.

(57) ABSTRACT

A corrosive-gas-mixture-filled container includes a sealed container, and a gas filled in the sealed container and containing a corrosive gas. In the corrosive-gas-mixture-filled container, a concentration of water in a vapor phase in the gas is 400 mol ppm or less, the sealed container includes a cylindrical body portion including a metal layer having an inner surface in contact with a corrosive gas mixture, and a maximum height of a surface roughness of the inner surface of the metal layer of the cylindrical body portion is 50 μm or less.

16 Claims, 4 Drawing Sheets

(56) References Cited

FOREIGN PATENT DOCUMENTS

| | | |
|---|---|---|
| JP | 2001-193898 | 7/2001 |
| JP | 2003-500551 | 1/2003 |
| JP | 2016-084831 | 5/2016 |
| JP | 2017-179516 | 10/2017 |
| WO | 00/73722 | 12/2000 |
| WO | 2017/221594 | 12/2017 |
| WO | 2021/182045 | 9/2021 |

OTHER PUBLICATIONS

International Preliminary Report on Patentability, issued in the corresponding PCT application No. PCT/JP2023/010153, dated Oct. 10, 2024, 6 pages.

* cited by examiner

CORROSIVE-GAS-MIXTURE-FILLED CONTAINER AND CORROSIVE GAS COMPOSITION

TECHNICAL FIELD

The present invention relates to a corrosive-gas-mixture-filled container and a corrosive gas composition.

BACKGROUND ART

A container used for storing and transporting a liquefied gas and a compressed gas is generally made of a metal such as steel or an alloy, and is used for storing and supplying a gas in various industries. In recent years, demand for corrosive gases such as hydrogen sulfide and sulfur dioxide among liquefied gases has increased in a semiconductor manufacturing process. However, the corrosive gas has corrosiveness to metals and corrodes a sealed container, so that this property may cause a trace amount of metal impurities in the gas, which is a concern in the semiconductor manufacturing process. As a solution to this problem, there is an example in which corrosion resistance of a sealed container or a pipe is imparted by limiting an impurity concentration of a corrosive gas to be filled. For example, Patent Literature 1 proposes that a sealed container is less likely to be corroded by a hydrogen sulfide mixture in which a concentration of water in a vapor phase is 0.001 mol ppm or more and less than 75 mol ppm. In addition, Patent Literature 2 proposes that metal corrosion is suppressed by a sulfur dioxide mixture in which a concentration of water in a vapor phase is 0.005 mol ppm or more and less than 5000 mol ppm.

CITATION LIST

Patent Literature

[Patent Literature 1] WO2017-221594A
[Patent Literature 2] WO2021-182045A

SUMMARY OF INVENTION

Technical Problem

However, the hydrogen sulfide mixture described in Patent Literature 1 and the sulfur dioxide mixture described in Patent Literature 2 had the following problems.

That is, the hydrogen sulfide mixture described in Patent Literature 1 and the sulfur dioxide mixture described in Patent Literature 2 are used in a sealed container made of stainless steel generally known to have corrosion resistance to hydrogen sulfide and sulfur dioxide, and are not used without being limited to a metal material of the sealed container. In other words, in a case where the above-mentioned hydrogen sulfide mixture or the sulfur dioxide mixture is used, in a case where the sealed container is made of a metal material other than stainless steel, there is a risk that the sealed container may be corroded.

The present invention has been made in view of the above-mentioned problems, and an object of the present invention is to provide a corrosive-gas-mixture-filled container and a corrosive gas composition capable of suppressing corrosion of a sealed container by a corrosive gas mixture even in a case where a metal material of the sealed container is other than stainless steel.

Solution to Problem

As a result of intensive studies to solve the above-mentioned problems, the present inventors have found that the above-mentioned problems can be solved by specifying a concentration of water in a vapor phase in a corrosive gas mixture in a specific range and specifying a maximum height of a surface roughness of an inner surface of a cylindrical body portion of a sealed container in a specific range.

That is, one aspect of the present invention provides a corrosive-gas-mixture-filled container including a sealed container made of a metal, and a corrosive gas mixture that is filled in the above-mentioned sealed container and contains a corrosive gas and water in a vapor phase, in which a concentration of the above-mentioned water in the above-mentioned corrosive gas mixture is 400 mol ppm or less, the above-mentioned sealed container includes a cylindrical body portion, and a maximum height of a surface roughness of an inner surface of the above-mentioned cylindrical body portion is 50 μm or less. The cylindrical body portion in the present invention follows the definition described in JIS B 0190:2010.

According to the above-mentioned corrosive-gas-mixture-filled container, even in a case where a metal material of the sealed container is other than stainless steel, corrosion of the sealed container due to the corrosive gas mixture can be suppressed.

The reason why the corrosion of the sealed container due to the corrosive gas mixture can be suppressed by the present invention even in a case where the metal material of the sealed container is other than stainless steel is not clear, but the present inventors presume that it is based on the following reason.

That is, in a case where the concentration of the water in the corrosive gas mixture is 400 mol ppm or less, by setting the maximum height of the surface roughness of the inner surface of the cylindrical body portion of the sealed container to 50 μm or less, the water in the corrosive gas mixture is less likely to be captured in a recess of the inner surface of the cylindrical body portion, and even in a case where the water is captured, the water is easily released. Therefore, the amount of the corrosive gas which is dissolved in the water is reduced, and generation of a corrosive substance due to a reaction between the water and the corrosive gas is suppressed. In this way, the present inventors presume that the corrosion of the sealed container is suppressed even in a case where the metal material of the sealed container is other than stainless steel.

Another aspect of the present invention provides a corrosive gas composition obtained by being extracted from the above-mentioned corrosive-gas-mixture-filled container.

According to the corrosive gas mixture filled in the above-mentioned sealed container, it is possible to suppress corrosion of a sealed container made of a metal including a cylindrical body portion and having a maximum height of a surface roughness of an inner surface of a cylindrical body portion of 50 μm or less. Therefore, the corrosion of the sealed container can be suppressed even in a case where the metal material of the sealed container is other than stainless steel. Therefore, by suppressing the corrosion of the sealed container, it is possible to suppress the mixing of a metal component in the corrosive gas mixture. Therefore, the corrosive gas composition obtained by being extracted from the corrosive-gas-mixture-filled container is useful in a semiconductor manufacturing process or the like in which a low content of the metal component is required.

In the above-mentioned corrosive-gas-mixture-filled container, it is preferable that the concentration of the above-mentioned water in the above-mentioned corrosive gas mixture is 110 mol ppm or less, and the maximum height of the surface roughness of the above-mentioned inner surface of the above-mentioned cylindrical body portion is 6 μm or less.

In the above-mentioned corrosive-gas-mixture-filled container, it is more preferable that the concentration of the above-mentioned water in the above-mentioned corrosive gas mixture is 10 mol ppm or less.

In the above-mentioned corrosive-gas-mixture-filled container, it is still more preferable that the concentration of the above-mentioned water in the above-mentioned corrosive gas mixture is 1 mol ppm or less.

In the above-mentioned corrosive-gas-mixture-filled container, the metal constituting the above-mentioned sealed container may include an alloy steel.

The above-mentioned alloy steel may be manganese steel or chromium molybdenum steel.

In the above-mentioned corrosive-gas-mixture-filled container, the above-mentioned corrosive gas may be a sulfur-based gas.

The above-mentioned sulfur-based gas may be hydrogen sulfide or sulfur dioxide.

Advantageous Effects of Invention

According to the present invention, there are provided a corrosive-gas-mixture-filled container capable of suppressing corrosion of a sealed container by a corrosive gas mixture even in a case where a metal material of the sealed container is other than stainless steel, and a corrosive gas composition.

DESCRIPTION OF EMBODIMENTS

Figure 1:
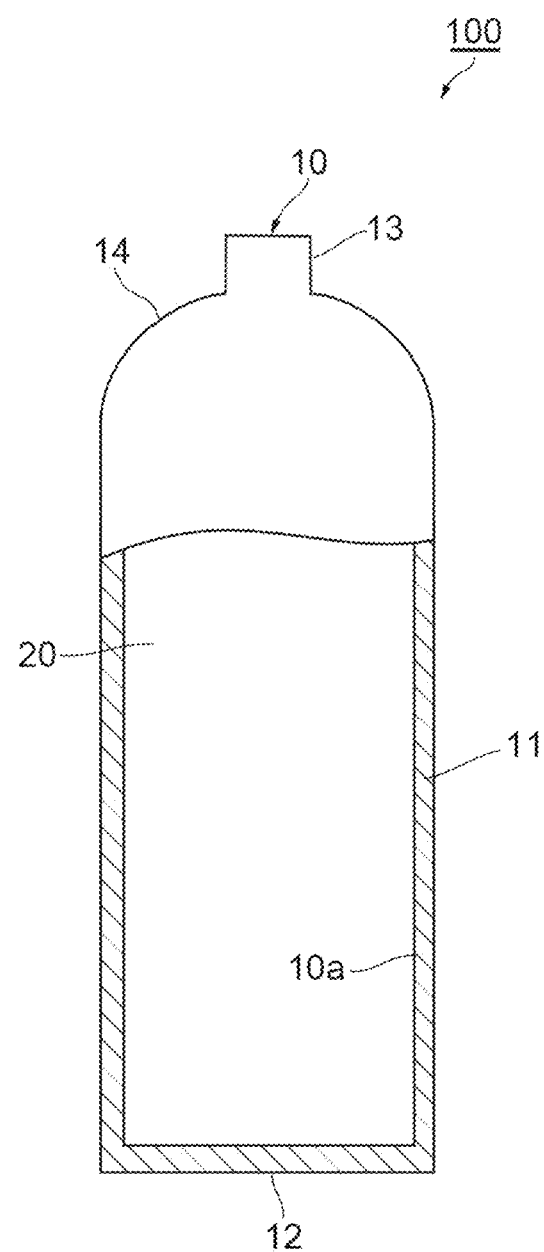
FIG. 1 is a partially cross-sectional view schematically showing one embodiment of a corrosive-gas-mixture-filled container according to the present invention.

Hereinafter, embodiments of a corrosive-gas-mixture-filled container according to the present invention will be described in detail with reference to the drawings. In the drawings, the same or corresponding parts are denoted by the same reference numerals, and redundant description will be omitted. Furthermore, dimensional ratios in the drawings are not limited to the shown ratios.

FIG. 1 is a partially cross-sectional view schematically showing one embodiment of a corrosive-gas-mixture-filled container according to the present invention. As shown in FIG. 1, a corrosive-gas-mixture-filled container 100 includes a sealed container 10, and a corrosive gas mixture 20 that is filled in the sealed container 10 and contains a corrosive gas and water in a vapor phase.

A water concentration of the vapor phase in the corrosive gas mixture 20 is 400 mol ppm or less, and the sealed container 10 includes a cylindrical body portion 11. In addition, a maximum height Rz of a surface roughness of an inner surface 10a of the cylindrical body portion 11 is 50 μm or less.

According to the corrosive-gas-mixture-filled container 100, even in a case where a metal material of the sealed container 10 is other than stainless steel, corrosion of the sealed container 10 due to the corrosive gas mixture can be suppressed.

Hereinafter, the sealed container 10 and the corrosive gas mixture 20 will be described in more detail.

<Sealed Container>

The sealed container 10 includes the cylindrical body portion 11. Specifically, as shown in FIG. 1, the sealed container 10 further includes a bottom 12 provided at a lower end of the cylindrical body portion 11, a gas discharge portion 13 provided on an upper end side of the cylindrical body portion 11 and provided with a valve for filling or discharging the corrosive gas mixture 20, and a shoulder portion 14 that connects the gas discharge portion 13 and the cylindrical body portion 11 to each other.

The sealed container 10 may be made of a metal, and may be composed of a single metal layer or a laminate of two or more metal layers.

The maximum height Rz of the surface roughness of the inner surface 10a of the cylindrical body portion 11 is only required to be 50 μm or less. From a viewpoint of further suppressing the corrosion of the sealed container 10 by the corrosive gas mixture 20, the maximum height Rz of the surface roughness of the inner surface 10a of the cylindrical body portion 11 is preferably 6 μm or less, more preferably 3 μm or less, and particularly preferably 1 μm or less.

The maximum height Rz of the surface roughness of the inner surface of a portion other than the cylindrical body portion 11 (for example, the bottom 12, the gas discharge portion 13, and the shoulder portion 14) is not particularly limited, and may be 50 μm or less or may be more than 50 μm.

The maximum height Rz of the surface roughness of the inner surface 10a of the cylindrical body portion 11 can be realized, for example, by polishing the inner surface of an unpolished container.

Examples of a polishing method include a physical polishing method such as blast polishing, buff polishing, and centrifugal barrel polishing, a chemical polishing method of performing a treatment with chemicals, and an electropolishing method of turning on electricity and polishing by bringing into contact with an electropolishing solution. The polishing method is not particularly limited to the above-mentioned polishing method.

The maximum height Rz of the surface roughness of the inner surface 10a of the cylindrical body portion 11 in the present invention can be measured based on JIS B 0633: 2001 and JIS B 0651:2001.

Specifically, in a case of measuring the maximum height Rz of the surface roughness, a surface roughness measuring device commercially available in a meter manufacturer can be used. Examples of such a surface roughness measuring device include a surface roughness measuring device manufactured by Mitutoyo Corporation.

The metal constituting the sealed container 10 is not particularly limited, and examples thereof include alloy steel such as manganese steel, stainless steel, and chromium molybdenum steel, carbon steel, and an aluminum alloy.

Among these, alloy steel is preferable. In this case, it is advantageous in terms of mechanical properties as compared with a case of using a metal other than the alloy steel. Among the alloy steels, manganese steel or chromium molybdenum steel is preferable. In this case, it is advantageous in terms of cost as compared with a case in which alloy steel other than manganese steel or chromium molybdenum steel is used.

<Corrosive Gas Mixture>

The corrosive gas mixture 20 includes a corrosive gas and water in a vapor phase.

The corrosive gas is not particularly limited as long as it is a gas having a property of corroding a metal, and examples thereof include a sulfur-based gas such as hydrogen sulfide or sulfur dioxide, a halogen-based gas such as hydrogen chloride or hydrogen bromide, and ammonia.

The water concentration of the vapor phase in the corrosive gas mixture 20 is only required to be 400 mol ppm or less. Here, the water concentration of the vapor phase in the corrosive gas mixture 20 is a value measured by a phosphorus pentoxide type dew point meter or a cavity ring-down spectroscopy (CRDS). Here, the measurement is performed under conditions of 20° C. to 25° C. (40° C. in a case of a pipe through which the corrosive gas mixture flows) and atmospheric pressure.

The water concentration of the vapor phase in the corrosive gas mixture 20 is preferably 110 mol ppm or less, more preferably 10 mol ppm or less, and still more preferably 1 mol ppm or less.

Here, in particular, in a case where the maximum height Rz of the surface roughness is 6 μm or less, the corrosion of the sealed container 10 by the corrosive gas mixture can be effectively suppressed.

The corrosive gas may be a liquefied gas or a non-liquefied gas, but is usually a liquefied gas.

A method of filling the corrosive gas mixture 20 is not particularly limited, but in a case where water remains in the sealed container 10, the water concentration in the filled corrosive gas mixture 20 is increased. Therefore, the inside of the sealed container 10 may be ventilated with dried inert gas in advance or the sealed container 10 may be subjected to a heat decompression treatment or the like so that a residual water amount in the sealed container 10 is 1 mol ppm or less.

<Corrosive Gas Composition>

A corrosive gas composition is a composition obtained by being extracted from the corrosive-gas-mixture-filled container 100.

According to the corrosive gas mixture filled in the above-mentioned sealed container 10, it is possible to suppress corrosion of the sealed container 10 made of a metal including the cylindrical body portion 11 and having a maximum height of a surface roughness of the inner surface 10a of the cylindrical body portion 11 of 50 μm or less. Therefore, the corrosion of the sealed container 10 can be suppressed even in a case where the metal material of the sealed container 10 is other than stainless steel. Therefore, by suppressing the corrosion of the sealed container 10, it is possible to suppress the mixing of a metal component in the corrosive gas mixture. Therefore, the corrosive gas composition obtained by being extracted from the corrosive-gas-mixture-filled container 100 is useful in a semiconductor manufacturing process or the like in which a low content of the metal component is required.

EXPERIMENTAL EXAMPLES

Hereinafter, experimental examples will be described.

[Test piece] Each of a rectangular (10 mm×50 mm×6 mm) manganese steel (150M36-S) having the maximum height Rz of a surface roughness of 1 μm, a rectangular (10 mm×50 mm×6 mm) manganese steel (150M36-S) having the maximum height Rz of a surface roughness of 40 μm, a rectangular (10 mm×50 mm×6 mm) manganese steel (150M36-S) having the maximum height Rz of a surface roughness of 145 μm, a rectangular (20 mm×50 mm×6 mm) chromium molybdenum steel (SAE4130-S) having the maximum height Rz of a surface roughness of 2 μm, a rectangular (20 mm×50 mm×6 mm) chromium molybdenum steel (SAE4130-S) having the maximum height Rz of a surface roughness of 35 μm, and a rectangular (20 mm×50 mm×6 mm) chromium molybdenum steel (SAE4130-S) having the maximum height Rz of a surface roughness of 125 μm was prepared as a test piece. The maximum height Rz of the surface roughness of the test piece was measured using a contact type surface roughness measuring device based on JIS B 0633:2001 and JIS B 0651:2001. As the contact type surface roughness measuring device, SJ-210 manufactured by Mitutoyo Corporation was used for the test pieces having the maximum heights Rz of 1 μm, 2 μm, 35 μm, and 40 μm. SJ-412 manufactured by Mitutoyo Corporation was used for the test pieces having the maximum heights Rz of 125 μm and 145 μm. The test piece is used instead of the sealed container in order to examine the effect of a value of the maximum height of the surface roughness of the inner surface of the cylindrical body portion of the sealed container.

Figure 2:
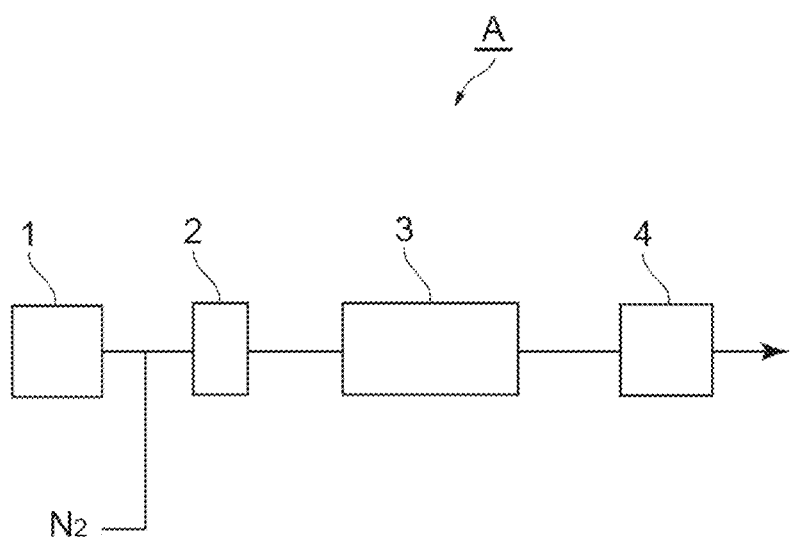
FIG. 2 is a flowchart showing an example of a corrosion resistance test device used in Experimental Example.

[Experimental Example 1] The manganese steel test piece having the maximum height Rz of the surface roughness of 1 μm was hung on a hook with a surface covered with Teflon (registered trademark) and placed in a storage container 3 made of SUS304 in a corrosion resistance test device A shown in FIG. 2, and the storage container 3 was sealed. Next, the storage container 3 was ventilated with a nitrogen gas at 2 L/min for 12 hours or longer to remove the water inside the storage container 3.

Subsequently, the storage container 3 was ventilated with a hydrogen sulfide mixed gas raw material 1 having a water concentration in a vapor phase of 1 mol ppm and containing hydrogen sulfide as a hydrogen sulfide mixed gas at 2 L/min for 30 minutes or longer. At this time, a flow rate of the hydrogen sulfide mixed gas was adjusted by a flow rate adjuster 2. In addition, for the hydrogen sulfide mixed gas discharged from the storage container 3, the water concentration of the vapor phase was measured with a water meter 4, and it was confirmed that the water concentration of the vapor phase was 1 mol ppm.

Subsequently, the storage container 3 was sealed such that an internal pressure was 0.02 MPaG, and the storage container 3 was filled with the hydrogen sulfide mixed gas.

The above-mentioned hydrogen sulfide mixed gas was stored at room temperature (25° C.) for about 30 days, and then the inside of the storage container 3 was sufficiently replaced with a nitrogen gas. Thereafter, the storage container 3 was opened to extract the test piece, and an S (sulfur) concentration was measured by SEM-EDS analysis. The results are shown in Table 1. The SEM-EDS analysis was performed using an SEM-EDS analyzer (manufactured by JEOL Ltd., JSM-IT200), and target elements were C, O, Al, Si, S, Ca, Mn, and Fe. In addition, in Table 1, a degree of suppression of the corrosion of the test piece by the corrosive gas mixture was evaluated based on the following evaluation criteria. The results are shown in Table 1.

<Evaluation Criteria>

◯: S concentration in the test piece was 15% by mass or less.

x: S concentration in the test piece was more than 15% by mass.

[Experimental Examples 2 to 13] The storage container 3 was filled with the hydrogen sulfide mixed gas in the same manner as in Experimental Example 1, except that a manganese steel test piece or a chromium molybdenum steel test piece in which the maximum height Rz of the surface roughness is a value shown in Table 1 was used as the test piece, and the hydrogen sulfide mixed gas raw material 1 in which the water concentration of the vapor phase is a value shown in Table 1 and contains hydrogen sulfide was used as the hydrogen sulfide mixed gas raw material 1.

Then, a hydrogen sulfide mixed gas was stored in the same manner as in Experimental Example 1, and the inside of the storage container 3 was sufficiently replaced with a nitrogen gas. Thereafter, the storage container 3 was opened to extract the test piece, and the S (sulfur) concentration was measured by the SEM-EDS analysis in the same manner as in Experimental Example 1. The results are shown in sealed container is other than stainless steel, it is considered that, in a case where the maximum height Rz of the surface roughness of the inner surface of the cylindrical body portion is 50 μm or less, the corrosion of the sealed container by the hydrogen sulfide mixed gas having the water concentration of the vapor phase of 400 mol ppm or less is suppressed.

[Experimental Example 14] The manganese steel test piece having the maximum height Rz of the surface roughness of 40 μm was hung on a hook with a surface covered with Teflon (registered trademark) and placed in a storage container 3 made of SUS304 in a corrosion resistance test device A shown in FIG. 2, and the storage container 3 was sealed. Next, the storage container 3 was ventilated with a nitrogen gas at 2 L/min for 12 hours or longer to remove the water inside the storage container 3.

Subsequently, the storage container 3 was ventilated with the sulfur dioxide mixed gas raw material 1 having a water concentration in a vapor phase of 1 mol ppm and containing sulfur dioxide as a sulfur dioxide mixed gas at 2 L/min for 30 minutes or longer. At this time, a flow rate of the sulfur dioxide mixed gas was adjusted by the flow rate adjuster 2. In addition, for the sulfur dioxide mixed gas discharged from the storage container 3, the water concentration of the vapor phase was measured with a water meter 4, and it was confirmed that the water concentration of the vapor phase was 1 mol ppm.

TABLE 1

| | Test piece material | Concentration of water in vapor phase [mol ppm] | Maximum height Rz [μm] | S concentration [% by mass] | Evaluation |
|---|---|---|---|---|---|
| Experimental Example 1 | Mn steel | 1 | 1 | 2 | ◯ |
| Experimental Example 2 | Mn steel | 10 | 1 | 4 | ◯ |
| Experimental Example 3 | Mn steel | 110 | 1 | 3 | ◯ |
| Experimental Example 4 | Mn steel | 310 | 1 | 8 | ◯ |
| Experimental Example 5 | Mn steel | 460 | 1 | 24 | X |
| Experimental Example 6 | Mn steel | 1 | 40 | 12 | ◯ |
| Experimental Example 7 | Mn steel | 10 | 40 | 13 | ◯ |
| Experimental Example 8 | Mn steel | 110 | 40 | 11 | ◯ |
| Experimental Example 9 | Mn steel | 310 | 40 | 13 | ◯ |
| Experimental Example 10 | Mn steel | 460 | 40 | 17 | X |
| Experimental Example 11 | Mn steel | 110 | 145 | 19 | X |
| Experimental Example 12 | Cr—Mo steel | 110 | 2 | 3 | ◯ |
| Experimental Example 13 | Cr—Mo steel | 110 | 125 | 20 | X |

Figure 3:
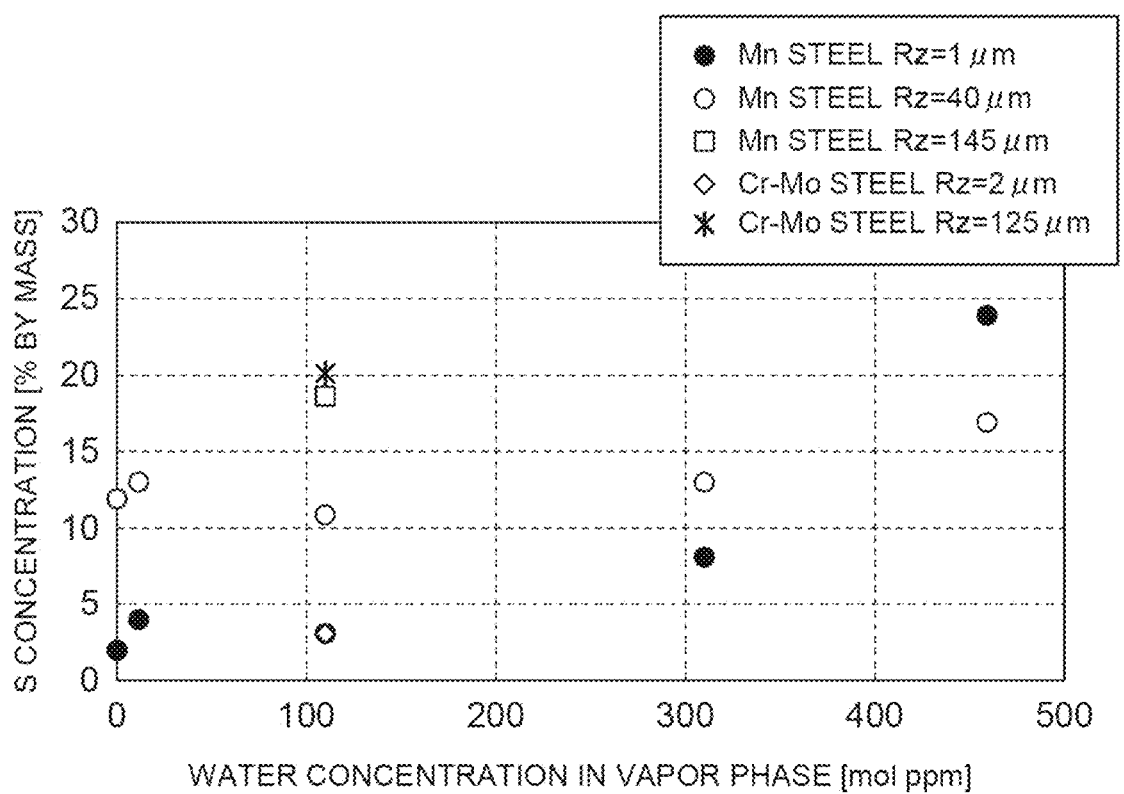
FIG. 3 is a graph showing a relationship between water concentration in a vapor phase in a hydrogen sulfide mixed gas and a S (sulfur) concentration in a test piece in Experimental Examples 1 to 13.

Based on the results shown in Table 1, the results of plotting the S concentration in the test piece by the SEM-EDS analysis with respect to the water concentration of the vapor phase in the hydrogen sulfide mixed gas are shown in FIG. 3. In FIG. 3, a horizontal axis represents the water concentration of the vapor phase in the hydrogen sulfide mixed gas, and a vertical axis represents the S concentration in the test piece.

The test results of the test piece shown in Table 1 and FIG. 3 can be similarly applied to a sealed container made of a metal. That is, even in a case where the metal material of the Subsequently, the storage container 3 was sealed such that an internal pressure was 0.02 MPaG, and the storage container 3 was filled with the sulfur dioxide mixed gas.

The above-mentioned sulfur dioxide mixed gas was stored at room temperature (25° C.) for about 30 days, and then the inside of the storage container 3 was sufficiently replaced with a nitrogen gas. Thereafter, the storage container 3 was opened to extract the test piece, and the S (sulfur) concentration along a depth direction from a surface of the test piece was measured by X-ray photoelectron spectroscopy (XPS) analysis. Target elements were C, O, S, Mn, and Fe.

A depth converted in terms of a $SiO_2$ thermal oxide film specifically shows a distance along the depth direction in a case where the $SiO_2$ thermal oxide film is measured under the same conditions.

In addition, based on the measurement result of the S concentration, an average S concentration at a depth of 10 to 40 nm (in terms of $SiO_2$ thermal oxide film) from the surface of the test piece was calculated. The results are shown in Table 2. Here, the average S concentration is an index of the amount of corrosive substances generated by a reaction a depth of 10 to 40 nm (in terms of $SiO_2$ thermal oxide film) from the surface of the test piece was calculated in the same manner as in Experimental Example 14. The results are shown in Table 2.

Furthermore, for the average S concentration calculated as described above, the degree of suppression of the corrosion of the test piece by a sulfur dioxide mixture was evaluated based on the evaluation criteria described above. The results are shown in Table 2.

TABLE 2

| | Test piece material | Concentration of water in vapor phase [mol ppm] | Maximum height Rz [μm] | Average S concentration at depth of 10 to 40 nm (in terms of $SiO_2$ thermal oxide film) [atomic %] | Evaluation |
|---|---|---|---|---|---|
| Experimental Example 14 | Mn steel | 1 | 40 | 1.23 | ○ |
| Experimental Example 15 | Mn steel | 10 | 40 | 1.28 | ○ |
| Experimental Example 16 | Mn steel | 480 | 40 | 1.69 | X |
| Experimental Example 17 | Mn steel | 1 | 145 | 1.50 | X |
| Experimental Example 18 | Cr—Mo steel | 1 | 35 | 0.67 | ○ |
| Experimental Example 19 | Cr—Mo steel | 10 | 125 | 1.61 | X | between water and a sulfur dioxide gas, and indicates that the amount of corrosive substances generated is smaller as the average S concentration is lower, that is, the corrosion of the test piece is suppressed.

Furthermore, for the average S concentration calculated as described above, the degree of suppression of the corrosion of the test piece by a sulfur dioxide mixture was evaluated based on the following evaluation criteria. The results are shown in Table 2.

<Evaluation Criteria>

○: Average S concentration at a depth of 10 to 40 nm (in terms of a $SiO_2$ thermal oxide film) from the surface of the test piece was 1.40 atomic % or less.

X: Average S concentration at a depth of 10 to 40 nm (in terms of a $SiO_2$ thermal oxide film) from the surface of the test piece was more than 1.40 atomic %.

[Experimental Examples 15 to 19] The storage container 3 was filled with the sulfur dioxide mixed gas in the same manner as in Experimental Example 14, except that a manganese steel test piece or a chromium molybdenum steel test piece in which the maximum height Rz of the surface roughness is a value shown in Table 2 was used as the test piece, and the sulfur dioxide mixed gas raw material 1 in which the water concentration of the vapor phase is a value shown in Table 2 and contains sulfur dioxide was used as the sulfur dioxide mixed gas raw material 1.

Figure 4:
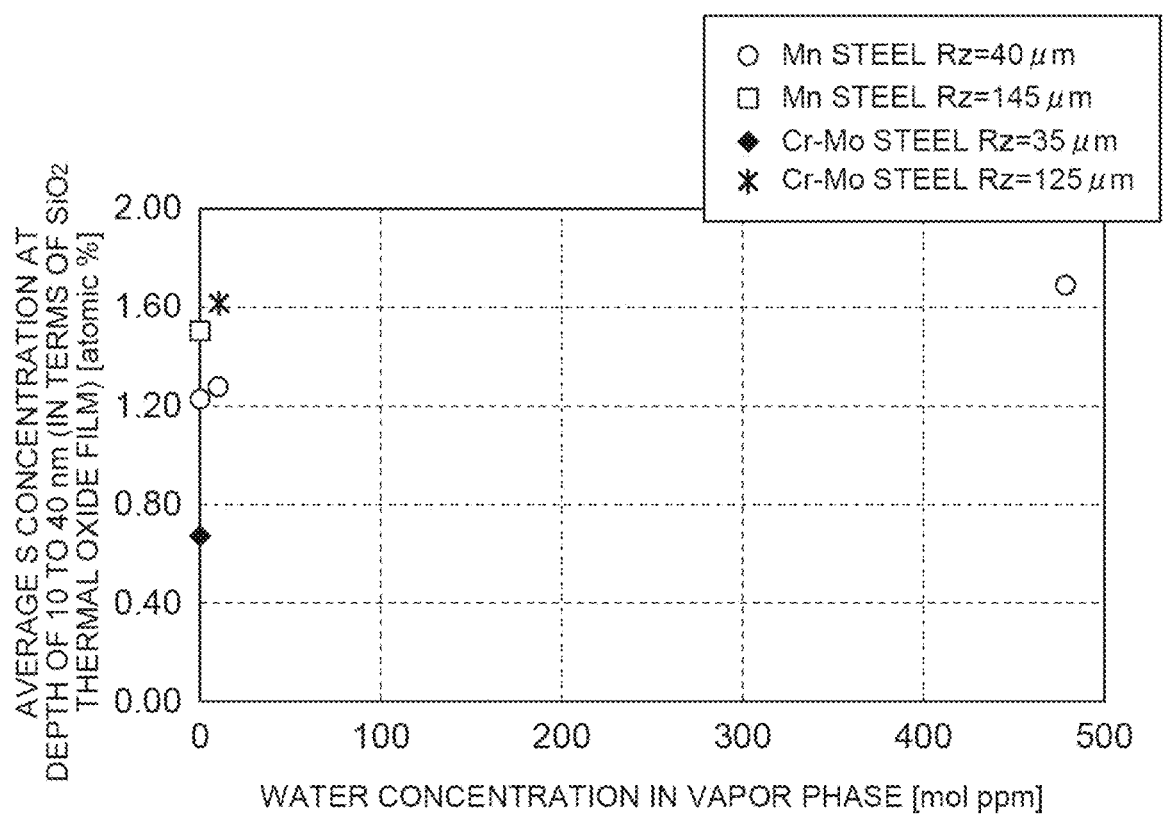
FIG. 4 is a graph showing a relationship between water concentration in a vapor phase in a sulfur dioxide mixed gas and an average S concentration at a depth of 10 to 40 nm from a surface of a test piece in Experimental Examples 14 to 19.

Then, a sulfur dioxide mixed gas was stored in the same manner as in Experimental Example 14, and the inside of the storage container 3 was sufficiently replaced with a nitrogen gas. Thereafter, the storage container 3 was opened to extract the test piece, and the S (sulfur) concentration along the depth direction from the surface of the test piece was measured by XPS analysis in the same manner as in Experimental Example 14. In addition, based on the measurement result of the S concentration, an average S concentration at FIG. 4 shows the results of plotting the average S concentration in the test piece at a depth of 10 to 40 nm (in terms of a $SiO_2$ thermal oxide film) by the XPS analysis. In FIG. 4, a horizontal axis represents the water concentration in the vapor phase, and a vertical axis represents the average S concentration in the test piece at a depth of 10 to 40 nm (in terms of a $SiO_2$ thermal oxide film).

The test results of the test piece shown in Table 2 and FIG. 4 can be similarly applied to a sealed container made of a metal as well. That is, even in a case where the metal material of the sealed container is other than stainless steel, it is considered that, in a case where the maximum height Rz of the surface roughness of the inner surface of the cylindrical body portion is 50 μm or less, the corrosion of the sealed container by the sulfur dioxide mixed gas having the water concentration of the vapor phase of 400 mol ppm or less is suppressed.

The summary of the present invention is as follows.

[1] A corrosive-gas-mixture-filled container including
a sealed container made of a metal, and
a corrosive gas mixture that is filled in the sealed container and contains a corrosive gas and water in a vapor phase,
in which a concentration of the water in the corrosive gas mixture is 400 mol ppm or less,
the sealed container includes a cylindrical body portion, and
a maximum height of a surface roughness of an inner surface of the cylindrical body portion is 50 μm or less.

[2] The corrosive-gas-mixture-filled container according to [1], in which the concentration of the water in the corrosive gas mixture is 400 mol ppm or less, and
the maximum height of the surface roughness of the inner surface of the cylindrical body portion is 6 μm or less.

[3] The corrosive-gas-mixture-filled container according to [2], in which the concentration of the water in the corrosive gas mixture is 110 mol ppm or less.

[4] The corrosive-gas-mixture-filled container according to [3], in which the concentration of the water in the corrosive gas mixture is 10 mol ppm or less.

[5] The corrosive-gas-mixture-filled container according to [4], in which the concentration of the water in the corrosive gas mixture is 1 mol ppm or less.

[6] The corrosive-gas-mixture-filled container according to any one of [1] to [5], in which the metal constituting the sealed container includes an alloy steel.

[7] The corrosive-gas-mixture-filled container according to [6], in which the alloy steel is manganese steel or chromium molybdenum steel.

[8] The corrosive-gas-mixture-filled container according to any one of [1] to [7], in which the corrosive gas is a sulfur-based gas.

[9] The corrosive-gas-mixture-filled container according to [8], in which the sulfur-based gas is hydrogen sulfide or sulfur dioxide.

[10] A corrosive gas composition obtained by being extracted from the corrosive-gas-mixture-filled container according to any one of [1] to [9].

REFERENCE SIGNS LIST

A: corrosion resistance test device
1: hydrogen sulfide mixed gas raw material or sulfur dioxide mixed gas raw material
2: flow rate adjuster
3: storage container
4: water meter
10: sealed container
10a: inner surface
11: cylindrical body portion
12: bottom
13: gas discharge portion
14: shoulder portion
20: corrosive gas mixture
100: corrosive-gas-mixture-filled container

The invention claimed is:

1. A corrosive-gas-mixture-filled container comprising:
a sealed container made of a metal; and
a corrosive gas mixture that is filled in the sealed container and comprises: a corrosive gas and water in a vapor phase,
wherein a concentration of the water in the corrosive gas mixture is 400 mol ppm or less,
the sealed container includes a cylindrical body portion, and
a maximum height of a surface roughness of an inner surface of the cylindrical body portion is 50 μm or less.

2. The corrosive-gas-mixture-filled container according to claim 1,
wherein
the maximum height of the surface roughness of the inner surface of the cylindrical body portion is 6 μm or less.

3. The corrosive-gas-mixture-filled container according to claim 2,
wherein the concentration of the water in the corrosive gas mixture is 110 mol ppm or less.

4. The corrosive-gas-mixture-filled container according to claim 3,
wherein the concentration of the water in the corrosive gas mixture is 10 mol ppm or less.

5. The corrosive-gas-mixture-filled container according to claim 4,
wherein the concentration of the water in the corrosive gas mixture is 1 mol ppm or less.

6. The corrosive-gas-mixture-filled container according to claim 1,
wherein the metal constituting the sealed container includes an alloy steel.

7. The corrosive-gas-mixture-filled container according to claim 6,
wherein the alloy steel is manganese steel or chromium molybdenum steel.

8. The corrosive-gas-mixture-filled container according to claim 1,
wherein the corrosive gas is a sulfur-based gas.

9. The corrosive-gas-mixture-filled container according to claim 8,
wherein the sulfur-based gas is hydrogen sulfide or sulfur dioxide.

10. The corrosive-gas-mixture-filled container according to claim 9, wherein the sulfur-based gas is hydrogen sulfide.

11. The corrosive-gas-mixture-filled container according to claim 9, wherein the sulfur-based gas is sulfur dioxide.

12. The corrosive-gas-mixture-filled container according to claim 1, wherein the corrosive-gas-mixture-filled container consists of:
the sealed container made of the metal; and
the corrosive gas mixture that is filled in the sealed container and comprises: the corrosive gas and water in the vapor phase.

13. The corrosive-gas-mixture-filled container according to claim 1, wherein the concentration of the water in the corrosive gas mixture is in a range from 0.1 mol ppm to 400 mol ppm.

14. The corrosive-gas-mixture-filled container according to claim 1, wherein, as measured by an SEM-EDS analysis, a sulfur concentration in a manganese steel piece having the maximum height of the surface roughness of 1 μm and being stored in the corrosive gas in the corrosive-gas-mixture-filled container at room temperature for 30 days is 15% by mass or less.

15. The corrosive-gas-mixture-filled container according to claim 1, wherein an average sulfur concentration along a depth direction of a manganese steel piece having the maximum height of the surface roughness of 40 μm and being stored in the corrosive gas in the corrosive-gas-mixture-filled container at room temperature for 30 days, is 1.40 atomic % or less, when measured by X-ray photoelectron spectroscopy in terms of a $SiO_2$ thermal oxide film at a depth from 10 to 40 nm from a surface of the manganese steel piece.

16. A corrosive gas composition obtained by being extracted from the corrosive-gas-mixture-filled container according to claim 1.

* * * * *